United States Patent
Farrington

(10) Patent No.: US 9,105,883 B2
(45) Date of Patent: Aug. 11, 2015

(54) ASSEMBLING BIPOLAR PLATES FOR FUEL CELLS USING MICROENCAPSULATED ADHESIVES

(75) Inventor: Simon Farrington, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 622 days.

(21) Appl. No.: 13/269,815

(22) Filed: Oct. 10, 2011

(65) Prior Publication Data

US 2013/0089809 A1 Apr. 11, 2013

(51) Int. Cl.
*H01M 8/02* (2006.01)
*H01M 8/10* (2006.01)

(52) U.S. Cl.
CPC .......... *H01M 8/0273* (2013.01); *H01M 8/0284* (2013.01); *H01M 8/0286* (2013.01); *H01M 8/0297* (2013.01); *H01M 2008/1095* (2013.01); *Y02E 60/50* (2013.01)

(58) Field of Classification Search
None
See application file for complete search history.

(56) References Cited

U.S. PATENT DOCUMENTS 4,931,420 A * 6/1990 Asano et al. .................. 503/205
2007/0117001 A1 5/2007 Farrington et al.

FOREIGN PATENT DOCUMENTS

JP 2009099531 A 5/2009
WO WO 2011-079378 * 7/2011

OTHER PUBLICATIONS

Machine translation of JP 2009-099531, May 2009.*

* cited by examiner

*Primary Examiner* — Jonathan Crepeau
(74) *Attorney, Agent, or Firm* — Patent Central LLC; Stephan A. Pendorf

(57) ABSTRACT

The flow field plates in a bipolar plate assembly for a fuel cell can be both bonded and sealed appropriately using microencapsulated adhesives. This offers several advantages over using other adhesives which may have limited pot life and/or require lengthy curing periods at elevated temperature during which time the plates must be stably positioned and under compression.

13 Claims, 2 Drawing Sheets

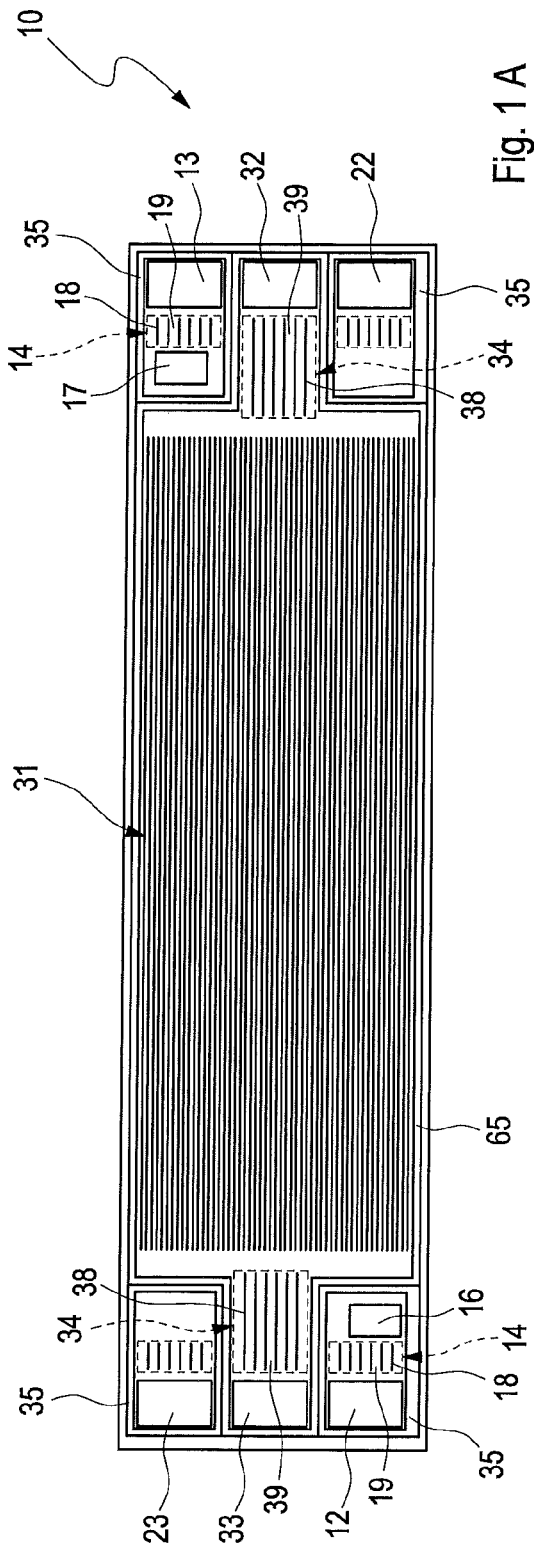
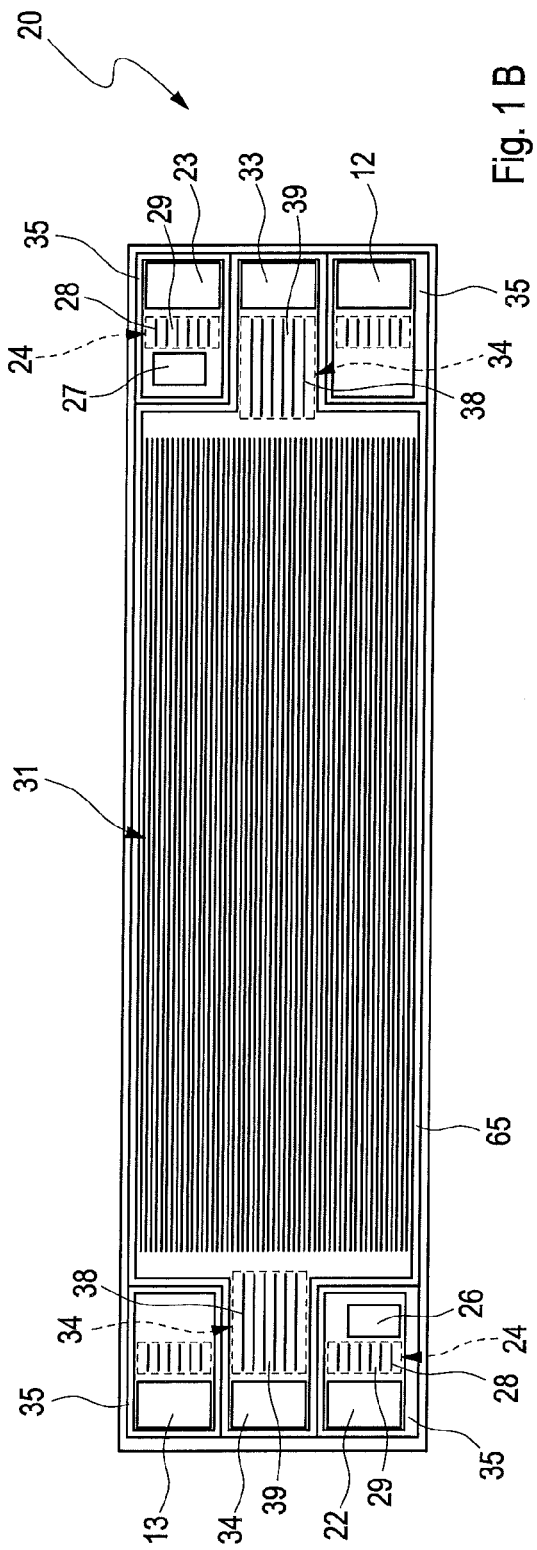

ASSEMBLING BIPOLAR PLATES FOR FUEL CELLS USING MICROENCAPSULATED ADHESIVES

BACKGROUND

1. Field of the Invention

This invention relates to bipolar plate assemblies for fuel cells and particularly to methods for bonding and sealing the component plates together.

2. Description of the Related Art

Fuel cells such as solid polymer electrolyte or proton exchange membrane fuel cells (PEMFCs) electrochemically convert reactants, namely fuel (such as hydrogen) and oxidant (such as oxygen or air), to generate electric power. PEMFCs generally employ a proton conducting polymer membrane electrolyte between two electrodes, namely a cathode and an anode. A structure comprising a proton conducting polymer membrane sandwiched between two electrodes is known as a membrane electrode assembly (MEA). In a typical fuel cell, flow field plates comprising numerous fluid distribution channels for the reactants are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1 V, a plurality of cells is usually stacked together in series for commercial applications. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields may be formed on the electrochemically inactive surfaces of the flow field plates and thus can distribute coolant evenly throughout the cells while keeping the coolant reliably separated from the reactants.

Bipolar plate assemblies comprising an anode flow field plate and a cathode flow field plate which have been bonded and appropriately sealed together so as to form a sealed coolant flow field between the plates are thus commonly employed in the art. Various transition channels, ports, ducts, and other features involving all three operating fluids (i.e. fuel, oxidant, and coolant) may also appear on the inactive side of these plates. The operating fluids may be provided under significant pressure and thus all the features in the plates have to be sealed appropriately to prevent leaks between the fluids and to the external environment. A further requirement for bipolar plate assemblies is that there is a satisfactory electrical connection between the two plates. This is because the substantial current generated by the fuel cell stack must pass between the two plates.

The plates making up the assembly may optionally be metallic, in which case they are typically welded together so as to appropriately seal all the fluid passages from each other and from the external environment. Additional welds may be provided to enhance the ability of the assembly to carry electrical current, particularly opposite the active areas of the plates. Metallic plates may however be bonded and sealed together using adhesives.

The plates making up the assembly may also optionally be carbonaceous (e.g. formed graphite plates) and such plates are frequently sealed together using elastomeric contact seals with the entire stack being held under a compression load applied by some suitable mechanical means. More recently, bipolar plate assemblies are being prepared using adhesives that are capable of withstanding the challenging fuel cell environment. Commonly, epoxy resin adhesives are employed for this purpose and are applied by screen printing or are otherwise dispensed in a pattern suitable for isolating each desired fluid cavity. Typically such adhesives must undergo a heat curing step.

Using heat-cured adhesives to bond and seal plates together can avoid the complexity and attention required when employing numerous elastomeric seals. However, there are several problems with using such adhesives. For instance, pot life of the adhesive can be short, so any equipment that is directly exposed to the adhesive during the application process must be cleaned periodically with strong solvents to prevent adhesive from curing on the equipment. Further, heat-curing can involve a lengthy, energy intensive thermal cycle. Alternative curing methods can also be problematic. For instance, UV curing is difficult because the adhesion joints are not externally visible. And anaerobic curing can be inhibited by the carbon plate materials themselves (typical adhesive resins require metallic ions present to initiate curing, but such ions are otherwise undesirable in the fuel cell). Further still, fixtures are typically required to accurately align, press, and hold the plates together during the cure cycle. Such fixtures must remain dimensionally stable over multiple thermal cycles, and this can be a challenging requirement. And additionally, the material properties of the adhesive can radically change between the time of application and the time of curing with undesirable consequences (e.g. the viscosity may significantly reduce as the glue is heated and run out of the joint or spread via capillary action across the parts and onto the fixtures used to locate and press the plates during curing).

Microencapsulated adhesives (or pressure activated adhesives) have been suggested for certain purposes in the construction of fuel cells. Generally, such adhesives have been suggested for use in bonding certain components together, but other components are relied on for sealing purposes. As an example, published patent application JP2009099531 discloses use of a micro-capsule type bonding agents for bonding certain components together.

Despite the advances made to date, there remains a need for greater simplification, reliability, and cost reduction in fuel cell assembly processes. This invention fulfills these needs and provides further related advantages.

SUMMARY

It has been found that bipolar plate assemblies can be bonded and sealed together using just an appropriately applied microencapsulated adhesive. Specifically, the method for bonding and sealing a bipolar plate assembly for a fuel cell comprises providing an anode flow field plate and a cathode flow field plate wherein the anode flow field plate comprises an anode flow field on one side, a coolant flow field on the other side, and a sealing surface on the coolant flow field side, and wherein the cathode flow field plate comprises a cathode flow field on one side, a coolant flow field on the other side, and a sealing surface on the coolant flow field side. Then, an amount of microencapsulated adhesive is applied to at least one of the flow field plates such that adhesive covers all the sealing surfaces between the plates when the coolant flow field sides of the plates are mated together in alignment.

The coolant flow field sides of the anode and cathode flow field plates are mated together in alignment, and the mated plates are pressed together at a sufficient pressure to break the encapsulant surrounding the microencapsulated adhesive, thereby releasing the adhesive and thereby bonding and sealing the anode and cathode flow field plates to make the bipolar plate assembly.

In a preferred embodiment, the profiles of the anode and cathode flow field plates are designed such that a gap exists at the sealing surfaces between the plates when the coolant flow field sides of the plates are mated together in alignment. While not essential for adhesive function, this allows for tight control of the thickness of the overall assembly. If so, the method preferably comprises selecting a microencapsulated adhesive in which the mean diameter of the microcapsules comprising the adhesive is greater than the nominal height of the gap. This selection attempts to ensure that the encapsulant is ruptured when the plates are pressed together. In this regard, it can be advantageous to select a microencapsulated adhesive in which the mean diameter of the microcapsules is greater than twice the nominal height of the gap (e.g. greater than about 1.5 mm for modest gap sizes). Alternatively, the nominal height of the gap can be chosen to be less than about 1.1 mm. Importantly, a suitable bond and seal can be achieved when the nominal width of the sealing surfaces is less than about 6 mm.

The method allows for some flexibility in the choice of adhesive formulation. For instance, because air is generally excluded from the encapsulated resin until the encapsulant is burst open, formulations might be used which would otherwise have too short of a pot life (e.g. single component epoxies). A suitable adhesive for use as an encapsulated adhesive therefore is a single component epoxy. A double component epoxy may also be employed for instance by applying amounts of two different microencapsulated adhesives in a desired ratio wherein the two different microencapsulated adhesives are the two components of the double component epoxy. Alternatively, each of the two different microencapsulated adhesives could be applied to a different one of the two plates to be joined, such that the two components mix on the bursting of the encapsulant.

A liquid carrier (e.g. water) may be used in applying the microencapsulated adhesive, and the applied adhesive is desirably dried (leaving the encapsulated adhesive lightly adhered to the plate or plates) before mating the plates together. Screen printing or other conventional techniques may be used for the applying step. When pressing the plates together, pressures greater than about 5.5 MPa (or 800 psi) may be employed for a period of time more than about 15 minutes. The adhesive which is released as a result of the pressing can then be cured.

The method is suitable for bipolar plate assemblies in which both the anode and cathode flow field plates are made of carbon. As shown in the Examples below, a suitable bond and seal for such a bipolar plate assembly can be obtained when the bond and seal solely consist of the microencapsulated adhesive. The bipolar plate assemblies may be desirable for use in the manufacture of fuel cells, and particularly solid polymer electrolyte fuel cells.

These and other aspects of the invention are evident upon reference to the attached Figures and following detailed description.

BRIEF DESCRIPTION OF THE DRAWINGS

FIGS. 1a and 1b show schematic surface views of the coolant side of an anode flow field plate and the coolant side of a cathode flow field plate respectively from an exemplary solid polymer fuel cell in the prior art. (These Figures are renumbered versions of prior art figures from US2007/0117001.)

FIG. 2a shows microencapsulated adhesive in aqueous carrier screen printed onto the sealing surfaces of one of the plates.

DETAILED DESCRIPTION

Figure 2:
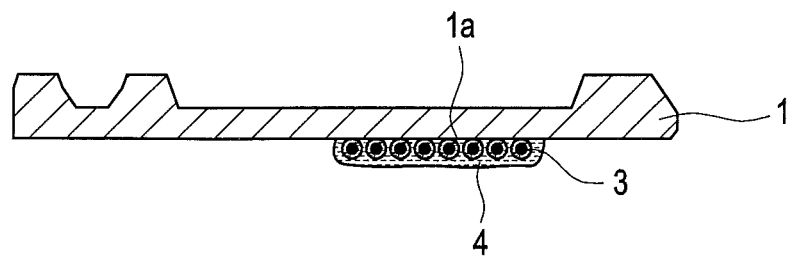
FIGS. 2a, b, and c show schematic side views of fuel cell flow field plates as they are bonded and sealed together into a bipolar plate assembly according to the method of the invention.
FIG. 2b shows both plates prior to pressing together and after the carrier has been dried off.
FIG. 2c shows the assembled bipolar plate after the adhesive has been released.
Figure 2:
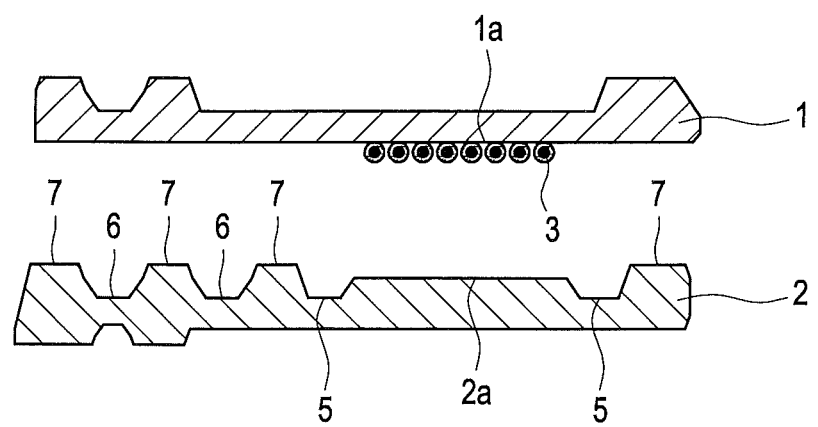
Figure 2:
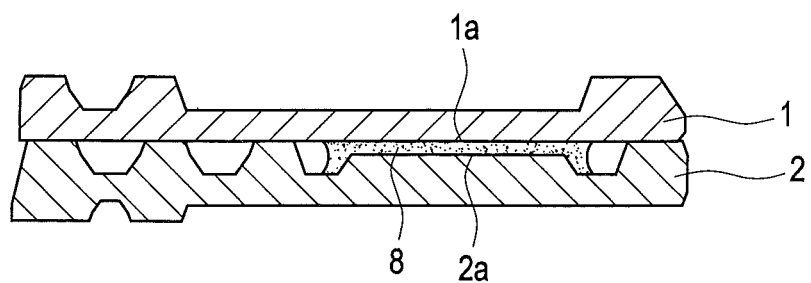

Herein, the following definition has been used which is consistent with industry standard DIN EN 923:2008-06. A microencapsulated adhesive is one in which particles or droplets of the adhesive or an adhesive component are enclosed in a protective film, thus forming microcapsules which comprise both the protective film (or encapsulant) and the adhesive or adhesive component. This is usually to prevent cross-linking until the film is destroyed by suitable means.

A PEMFC stack design suitable for automotive purposes typically comprises a series stack of generally rectangular, planar PEM fuel cells. Bipolar plate assemblies with coolant flow fields formed within are typically employed in such stacks. FIGS. 1a and 1b show schematic surface views of the coolant side of an anode flow field plate and the coolant side of a cathode flow field plate respectively from an exemplary solid polymer fuel cell in the prior art. (These figures are renumbered versions of prior art figures from US2007/0117001.) Numerous features may be present on flow field plates such as those illustrated in these figures. For instance in FIG. 1a, anode flow field plate 10 comprises fuel flow fields on the opposite side (not shown), fuel inlet manifold opening 12, fuel outlet manifold opening 13, fuel transition regions 14 (shown in the dotted boxes), fuel backfeed inlet slot 16, fuel backfeed outlet slot 17, a plurality of ridges 18 that form fuel transition flow passages 19, oxidant inlet manifold opening 22, oxidant outlet manifold opening 23, coolant inlet manifold opening 32, coolant outlet manifold opening 33, coolant flow fields 31, coolant transition regions 34, (shown in the dotted boxes), a plurality of ridges 38 that form coolant transition flow passages 39, manifold seal groove 35, and seal groove 65.

Similarly in FIG. 1b, cathode flow field plate 20 comprises oxidant flow fields on the opposite side (not shown), oxidant inlet manifold opening 22, oxidant outlet manifold opening 23, cathode transition regions 24 (shown in the dotted boxes), oxidant backfeed inlet slot 26, oxidant backfeed outlet slot 27, a plurality of ridges 28 that form oxidant transition flow passages 29, fuel inlet manifold opening 12, fuel outlet manifold opening 13, coolant inlet manifold opening 32, coolant outlet manifold opening 33, coolant flow fields 31, coolant transition regions 34 (shown in the dotted boxes), a plurality of ridges 38 that form coolant transition flow passages 39, manifold seal groove 35, and seal groove 65.

The prior art embodiments shown in FIGS. 1a and 1b would typically be sealed using suitable elastomeric seals in the groove locations and by applying a sufficient compression load over the entire fuel cell stack with some suitable mechanical means (clamps, bands, or the like).

In FIGS. 2a, b, and c, schematic side views of similar fuel cell flow field plates are shown as they are bonded and sealed together into a bipolar plate assembly according to the method of the invention. FIG. 2a shows microencapsulated adhesive in an aqueous carrier screen printed onto the sealing surfaces of one of the plates. FIG. 2b shows both plates prior to pressing together and after the carrier has been dried off. FIG. 2c shows the assembled bipolar plate after the adhesive has been released.

For illustration purposes, plate 1 in these figures will be assumed to be a cathode flow field plate and plate 2 to be an anode flow field plate. However, plate 1 could alternatively be an anode flow field plate and plate 2 could be a cathode flow field plate.

In FIG. 2a, microencapsulated adhesive 3 in liquid carrier 4 has been applied to sealing surface 1a on cathode flow field plate 1. Microencapsulated adhesive may be applied using screen printing techniques or any other suitable conventional coating technique.

In FIG. 2b, liquid carrier 4 has been dried off leaving behind lightly adhered microencapsulated beads of adhesive 3. As shown, anode flow field plate 2 is aligned with cathode flow field plate 1 and the two plates are ready to be pressed together. The various features shown on anode flow field plate 2 are sealing surface 2a, spill grooves 5, coolant flow field channels 6, and mating surfaces 7. Spill grooves 5 are optionally included to provide space for excess adhesive. In FIG. 2b, sealing surface 2a is designed to be slightly lower than mating surfaces 7 such that a gap will exist between sealing surfaces 1a and 2a when the plates are mated together. This allows one to maintain tight control of the thickness of the assembly. Preferably consideration is given to the plate design and choice of microencapsulated adhesives such that the gap is substantially less than the microcapsule or bead size of the microencapsulated adhesive. In this way, the probability that the microencapsulated adhesive beads will rupture is quite high.

The plates are then pressed together at a sufficient pressure (e.g. greater than 800 psi) for a sufficient time to ensure rupture of a majority of the beads of microencapsulated adhesive and also to allow enough time to achieve a sufficient, at least preliminary, cure of the adhesive. As illustrated in the following Examples, a single component epoxy can cure sufficiently after 15 minutes of pressing and exposure to air such that the assembly can be removed from the compression apparatus. Curing may be allowed to continue for additional time as desired.

FIG. 2c shows the final bipolar plate assembly with cured adhesive 8 bonding and sealing plates 1 and 2 together at sealing surfaces 1a and 2a.

The method of the invention can be expected to provide suitable bonds and seals for various choices of plate materials and compatible microencapsulated adhesives. A particularly suitable combination are carbon or carbon composite flow field plates and either single or double component epoxies.

Other embodiments may be contemplated which obtain the advantages of the invention. For instance, the present invention may be employed to bond and seal plates such as those shown in FIGS. 1a and 1b. However, in such a case, the groove depths on one or both plates might be reduced or omitted. And microencapsulated adhesive would preferably be selected to have a bead diameter greater than the resulting gap in the grooves after the plates are bonded together.

Further still, embodiments might be considered in which more than one different microencapsulated adhesive or adhesive component is used (e.g. the two different components of a double component epoxy or other adhesive). These different microencapsulated adhesives or adhesive components might then be mixed or applied separately to opposing plate surfaces.

The invention offers several possible advantages over prior art embodiments. For example, the pot life of the adhesive may no longer be a problem since the "ink" comprising the microencapsulated adhesive and liquid carrier to be printed onto the plates can now effectively be a stable dispersion of small bubbles. The adhesive itself inside these bubbles is separated from the screens or other printing equipment. Carrier liquid can be used for screen cleaning and unused microencapsulated adhesive beads simply filtered out and reused.

Further, adhesives may be employed that do not require a lengthy thermal curing cycle, thereby saving large amounts of energy, time and cost in what could be an otherwise expensive process step. In fact the material properties of the adhesive can be better tailored to the application method by modifying the composition of the dispersion.

And, since activation of the adhesive is achieved by the application of pressure here, the adhesive can be activated when desired. For instance, adhesion may be activated right at a final assembly step of a fuel cell stack. This can be advantageous because fixturing is not required to press and accurately hold the plates together during curing. Instead, fixturing can be used to align individual plates of all the components in the fuel cell stack in a final assembly step, thereby improving final plate-to-plate and cell-to-cell alignment.

The following examples are illustrative of the invention but should not be construed as limiting in any way.

EXAMPLE

A series of experimental fuel cell plates were assembled into bipolar plate assemblies using microencapsulated adhesives and the seal integrity was tested using pressurized fluids.

Square molded carbon composite plates from Nisshinbo (about 12 cm per side) were used. In each assembly, a flat circular groove (about 10 cm in diameter and having ample oversize width in all cases, but having varied groove depths) was machined in one plate in order to create sealing surfaces with varying width and depth. A central port and cross shaped grooves were also formed within the circular sealing groove to allow pressurized test fluid to access the sealed space within the assembly. The other plate in the assembly was left alone and thus was flat and featureless.

The microencapsulated adhesive used in all cases was Microlock™, a single component epoxy based adhesive in an aqueous carrier from MicroTek. The microencapsulated adhesive beads had a mean diameter of about 0.15 mm.

Bipolar plate assemblies were then prepared in the following manner. The adhesive was applied manually to the sealing grooves of the machined plate. A Kapton plastic mask was used to mask out the desired width of adhesive and spreader bars were used to level the applied adhesive. Thus, the surface of the applied microencapsulated adhesive was well above that of the carbon plate. The applied adhesive was allowed to air dry and then the flat plate was pressed against the adhesive side of the machined plate at 900 psi or 6.2 MPa (based on the area of the applied adhesive) and room temperature for about 15 minutes. The assembly was then removed from the press and for certainty was allowed to cure for an additional 3 days to ensure the maximum bond was obtained.

The bipolar plate assemblies were then tested in a pressure testing jig which applied compressed air at increasing pressures to the cavity within the assembly. A modest compressive force of 50 kN was applied to the bipolar plate assembly in order to effect an O-ring seal between the central hole of the machined plate in the assembly and the compressed air supply of the jig. The compressed air pressure was then increased in approximately 10 psi increments up to about 95 psi or until a leak was detected. Table 1 below summarizes the results from pressure testing these experimental assemblies.

TABLE 1

| Test | Width of applied adhesive (mm) | Groove depth (mm) | Result |
|---|---|---|---|
| 1 | 6 | 0.08 | Failed at 50 psi due to O-ring failure |
| 2 | 6 | 0.05 | Good to 60 psi; failed at 70 psi |
| 3 | 6 | 0.05 | Good to 60 psi; failed at 70 psi |
| 4 | 4 | 0.05 | Good to 60 psi; failed at 70 psi |
| 5 | 4 | 0.11 | Good to 60 psi; failed at 70 psi |
| 6 | 4 | 0.11 | Good to 60 psi; failed at 70 psi |

With the exception of Test 1 which failed at 50 psi due to an O-ring failure unrelated to the adhesive seal, all the samples were leak tight at pressures up to 60 psi. This is considered acceptable for typical fuel cell constructions, and particularly for automotive applications. These Examples demonstrate that the method of the invention can be used to obtain acceptable seals for practical bipolar plate assemblies.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A method for bonding and sealing a bipolar plate assembly for a fuel cell comprising:
    providing an anode flow field plate and a cathode flow field plate wherein the anode flow field plate comprises an anode flow field on one side, a coolant flow field on the other side, and a sealing surface on the coolant flow field side, and wherein the cathode flow field plate comprises a cathode flow field on one side, a coolant flow field on the other side, and a sealing surface on the coolant flow field side;
    applying an amount of microencapsulated adhesive to at least one of the flow field plates such that adhesive covers all the sealing surfaces between the plates when the coolant flow field sides of the plates are mated together in alignment;
    mating the coolant flow field sides of the anode and cathode flow field plates together in alignment such that the applied microencapsulated adhesive contacts the sealing surface on the coolant flow field side of the anode flow field plate and the sealing surface on the coolant flow field side of the cathode flow field plate; and
    pressing the mated plates together at a sufficient pressure to break the encapsulant surrounding the microencapsulated adhesive, thereby releasing the adhesive and thereby bonding and sealing the anode and cathode flow field plates to make the bipolar plate assembly
    wherein the profiles of the anode and cathode flow field plates are such that a gap exists at the sealing surfaces between the plates when the coolant flow field sides of the plates are mated together in alignment; and the method comprises selecting a microencapsulated adhesive in which the mean diameter of the microcapsules is greater than the nominal height of the gap.

2. The method of claim 1 comprising selecting a microencapsulated adhesive in which the mean diameter of the microcapsules is greater than twice the nominal height of the gap.

3. The method of claim 1 comprising selecting a microencapsulated adhesive in which the mean diameter of the microcapsules is greater than about 1.5 mm.

4. The method of claim 1 wherein the nominal height of the gap is less than about 1.1 mm.

5. The method of claim 1 wherein the nominal width of the sealing surfaces is less than about 6 mm.

6. The method of claim 1 wherein the encapsulated adhesive is a single component epoxy.

7. The method of claim 1 comprising applying amounts of two different microencapsulated adhesives wherein the two different microencapsulated adhesives are the two components of a double component epoxy.

8. The method of claim 1 wherein the applying comprises screen printing.

9. The method of claim 1 comprising pressing the plates together at a pressure greater than 5.5 MPa.

10. The method of claim 1 comprising pressing for more than about 15 minutes.

11. The method of claim 1 comprises curing the released adhesive after the pressing.

12. The method of claim 1 wherein the anode and cathode flow field plates are made of carbon.

13. The method of claim 1 wherein the bond and seal for the bipolar plate assembly consists of the microencapsulated adhesive.

* * * * *